United States Patent
Loose et al.

(10) Patent No.: US 7,585,220 B2
(45) Date of Patent: *Sep. 8, 2009

(54) GAMING MACHINE WITH SUPERIMPOSED DISPLAY IMAGE

(75) Inventors: Timothy C. Loose, Chicago, IL (US); Wayne H. Rothschild, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/607,645

(22) Filed: Dec. 1, 2006

(65) Prior Publication Data

US 2007/0077986 A1    Apr. 5, 2007

Related U.S. Application Data

(63) Continuation of application No. 10/321,896, filed on Dec. 17, 2002, now Pat. No. 7,160,187, which is a continuation of application No. 09/862,574, filed on May 22, 2001, now Pat. No. 6,517,433.

(51) Int. Cl.
    *A63F 3/00* (2006.01)
(52) U.S. Cl. ..................... 463/20; 273/138.1
(58) Field of Classification Search .............. 273/138.1, 273/275, 143
    See application file for complete search history.

(56) References Cited

U.S. PATENT DOCUMENTS

| | | | |
|---|---|---|---|
| 4,454,670 A | 6/1984 | Bachmann et al. | 194/350 |
| 4,517,558 A | 5/1985 | Davids | 340/700 |
| 4,562,433 A | 12/1985 | Biferno | 340/716 |
| 4,718,672 A | 1/1988 | Okada | 273/143 R |
| 5,393,061 A | 2/1995 | Manship et al. | 273/143 R |
| 5,580,055 A | 12/1996 | Hagiwara | 273/143 R |
| 5,697,843 A | 12/1997 | Manship et al. | 463/20 |
| 5,725,210 A | 3/1998 | Yamaguchi et al. | 273/121 |
| 5,752,881 A | 5/1998 | Inoue | 273/143 R |
| 5,980,384 A | 11/1999 | Barrie | 463/16 |
| 6,027,115 A | 2/2000 | Griswold et al. | 273/143 R |
| 6,036,188 A | 3/2000 | Gomez et al. | 273/118 R |
| 6,038,188 A | 3/2000 | Akamatsu | 365/226 |
| 6,056,642 A | 5/2000 | Bennett | 463/20 |
| 6,086,066 A * | 7/2000 | Takeuchi et al. | 273/143 R |
| 6,089,977 A | 7/2000 | Bennett | 463/20 |
| 6,095,921 A | 8/2000 | Walker et al. | 463/20 |
| 6,135,884 A | 10/2000 | Hedrick et al. | 463/20 |
| 6,135,885 A | 10/2000 | Lermusiaux | 463/20 |
| 6,164,645 A | 12/2000 | Weiss | 273/138.2 |

(Continued)

FOREIGN PATENT DOCUMENTS

EP    0 060 019 A1    9/1982

(Continued)

OTHER PUBLICATIONS

"Bigfoot" Product Sheet, Shuffle Master, Inc., 1 page (2000).

(Continued)

*Primary Examiner*—Vishu K. Mendiratta
(74) *Attorney, Agent, or Firm*—Nixon Peabody LLP

(57) ABSTRACT

A spinning reel slot machine comprises a plurality of mechanical rotatable reels and a video display. In response to a wager, the reels are rotated and stopped to randomly place symbols on the reels in visual association with a display area. The video display provides a video image superimposed upon the reels. The video image may be interactive with the reels and include such graphics as payout values, a pay table, pay lines, bonus game features, special effects, thematic scenery, and instructional information.

59 Claims, 10 Drawing Sheets

U.S. PATENT DOCUMENTS

| | | | |
|---|---|---|---|
| 6,181,301 B1 | 1/2001 | Inoguchi et al. | 345/5 |
| 6,224,482 B1 | 5/2001 | Bennett | 463/20 |
| 6,251,013 B1 * | 6/2001 | Bennett | 463/13 |
| 6,261,177 B1 | 7/2001 | Bennett | 463/16 |
| 6,270,411 B1 | 8/2001 | Gura et al. | 463/20 |
| 6,290,600 B1 | 9/2001 | Glasson | 463/20 |
| 6,364,766 B1 | 4/2002 | Anderson et al. | 463/16 |
| 6,368,216 B1 | 4/2002 | Hedrick et al. | 463/20 |
| 6,375,568 B1 | 4/2002 | Roffman et al. | 463/26 |
| 6,419,579 B1 | 7/2002 | Bennett | 463/20 |
| 6,517,432 B1 | 2/2003 | Jaffe | 463/16 |
| 6,517,433 B2 | 2/2003 | Loose et al. | 463/20 |
| 6,817,946 B2 | 11/2004 | Motegi et al. | 463/31 |
| 6,937,298 B2 | 8/2005 | Okada | 349/58 |
| 7,097,560 B2 | 8/2006 | Okada | 463/20 |
| 7,140,963 B2 | 11/2006 | Kojima | 463/20 |
| 7,159,865 B2 | 1/2007 | Okada | 273/143 |
| 7,160,187 B2 | 1/2007 | Loose et al. | 463/20 |
| 7,166,029 B2 | 1/2007 | Enzminger | 463/20 |
| 7,255,643 B2 | 8/2007 | Ozaki et al. | 463/20 |
| 2001/0031658 A1 | 10/2001 | Ozaki et al. | 463/16 |
| 2002/0175466 A1 | 11/2002 | Loose et al. | 273/143 |
| 2003/0060269 A1 | 3/2003 | Paulsen et al. | 463/20 |
| 2003/0087690 A1 | 5/2003 | Loose et al. | 463/20 |
| 2003/0157980 A1 | 8/2003 | Loose et al. | 463/20 |
| 2003/0234489 A1 | 12/2003 | Okada | 273/236 |
| 2003/0236118 A1 | 12/2003 | Okada | 463/20 |
| 2004/0014520 A1 | 1/2004 | Okada | 463/20 |
| 2004/0029636 A1 | 2/2004 | Wells | 463/32 |
| 2004/0063490 A1 | 4/2004 | Okada | 463/20 |
| 2004/0116178 A1 | 6/2004 | Okada | 463/20 |
| 2004/0147303 A1 | 7/2004 | Imura et al. | 463/16 |
| 2004/0150162 A1 | 8/2004 | Okada | 273/292 |
| 2004/0152502 A1 | 8/2004 | Okada | 463/16 |
| 2004/0166925 A1 | 8/2004 | Emori et al. | 463/20 |
| 2004/0166926 A1 | 8/2004 | Adachi et al. | 463/20 |
| 2004/0171418 A1 | 9/2004 | Okada | 463/20 |
| 2004/0198485 A1 | 10/2004 | Loose et al. | 463/20 |
| 2004/0207154 A1 | 10/2004 | Okada | 273/138.1 |
| 2004/0209666 A1 | 10/2004 | Tashiro et al. | 463/20 |
| 2004/0209667 A1 | 10/2004 | Emori et al. | 463/20 |
| 2004/0209668 A1 | 10/2004 | Okada | 463/20 |
| 2004/0209670 A1 | 10/2004 | Adachi et al. | 463/20 |
| 2004/0209671 A1 | 10/2004 | Okada | 463/20 |
| 2004/0209672 A1 | 10/2004 | Okada | 463/20 |
| 2004/0209678 A1 | 10/2004 | Okada | 463/30 |
| 2004/0209681 A1 | 10/2004 | Emori et al. | 463/31 |
| 2004/0209682 A1 | 10/2004 | Okada | 463/31 |
| 2004/0214635 A1 | 10/2004 | Okada | 463/30 |
| 2004/0214637 A1 | 10/2004 | Nonaka | 463/31 |
| 2004/0219965 A1 | 11/2004 | Okada | 463/16 |
| 2004/0224747 A1 | 11/2004 | Okada | 463/16 |
| 2004/0224758 A1 | 11/2004 | Okada et al. | 463/31 |
| 2004/0227286 A1 | 11/2004 | Tanimura et al. | 273/143 |
| 2004/0227866 A1 | 11/2004 | Okada | 349/58 |
| 2004/0229680 A1 | 11/2004 | Hoshino et al. | 463/20 |
| 2004/0229686 A1 | 11/2004 | Tanimura et al. | 463/30 |
| 2004/0266510 A1 | 12/2004 | Kojima | 463/16 |
| 2004/0266515 A1 | 12/2004 | Gauselmann | 463/20 |
| 2004/0266521 A1 | 12/2004 | Kojima | 463/20 |
| 2005/0032571 A1 | 2/2005 | Asonuma | 463/20 |
| 2005/0140088 A1 | 6/2005 | Randall | 273/143 |
| 2005/0153775 A1 | 7/2005 | Griswold et al. | |
| 2005/0187003 A1 | 8/2005 | Adachi et al. | 463/16 |
| 2005/0192090 A1 | 9/2005 | Muir et al. | 463/30 |
| 2005/0255908 A1 | 11/2005 | Wells | 463/20 |
| 2005/0272500 A1 | 12/2005 | Tanimura et al. | 463/20 |
| 2005/0282616 A1 | 12/2005 | Tanimura et al. | 463/20 |
| 2005/0282617 A1 | 12/2005 | Sekiguchi et al. | 463/20 |
| 2006/0014580 A1 | 1/2006 | Hawthorn | 463/20 |
| 2006/0135248 A1 | 6/2006 | Anderson et al. | 463/22 |
| 2006/0252496 A1 | 11/2006 | Rasmussen | 463/20 |
| 2006/0281530 A1 | 12/2006 | Seelig et al. | 463/20 |
| 2007/0004513 A1 | 1/2007 | Wells et al. | 463/31 |
| 2007/0054730 A1 | 3/2007 | Mattice et al. | 463/16 |
| 2007/0149281 A1 | 6/2007 | Gadda et al. | 463/34 |

FOREIGN PATENT DOCUMENTS

| | | |
|---|---|---|
| EP | 0 789 338 A1 | 8/1997 |
| GB | 2 124 505 A | 2/1984 |
| GB | 2 165 074 A | 4/1986 |
| GB | 2 253 299 A | 9/1992 |
| GB | 2 349 494 A | 11/2000 |
| JP | 05-177043 | 7/1993 |
| JP | 06-039085 | 2/1994 |
| JP | 07-16340 | 1/1995 |
| JP | 07-124290 | 5/1995 |
| JP | 4072 99189 A | 11/1995 |
| JP | 07299189 A * | 11/1995 |
| JP | 08-103541 | 4/1996 |
| JP | 2531253 | 1/1997 |
| JP | 9-207625 | 8/1997 |
| JP | 10-071228 | 3/1998 |
| JP | 10-091076 | 4/1998 |
| JP | 10-305130 | 11/1998 |
| JP | 10-328398 | 11/1998 |
| JP | 11-090017 | 4/1999 |
| JP | 11-099240 | 4/1999 |
| JP | 11-137774 | 5/1999 |
| JP | 11-152970 | 6/1999 |
| JP | 11-153970 | 6/1999 |
| JP | 11-244451 | 9/1999 |
| JP | 2000-51314 | 2/2000 |
| JP | 2000-65097 | 3/2000 |
| JP | 2000-68925 | 3/2000 |
| JP | 2000-262738 | 9/2000 |
| JP | 2001-350805 | 12/2000 |
| JP | 2001-062032 | 3/2001 |
| JP | 2000-238995 | 9/2001 |
| JP | 2002-113150 | 4/2002 |
| WO | WO 99/53454 A1 | 10/1999 |
| WO | WO 99/64997 A1 | 12/1999 |
| WO | WO 00/32286 A1 | 6/2000 |
| WO | WO2006/036948 A2 | 4/2006 |
| WO | WO2006/124976 A1 | 11/2006 |
| WO | WO2007/011717 A2 | 1/2007 |

OTHER PUBLICATIONS

"Big Games Safari" Product Sheet, IGT, 24 pages (2000).
"Cabby Cash™" Product Sheet, Anchor Gaming, 2 pages (2000).
"Congo Quest™" Product Sheet, Anchor Gaming, 2 pages (2000).
"Fishin' Buddies™" Product Sheet, Anchor Gaming, 2 pages (2000).
Legato, Frank, "The Full Monty," Strictly Slots, pp. 48-50 (Jun. 1999).
"Goooaal!" Product Sheet, Bally Gaming, Inc., 2 pages (2000).
"Great Whites" Product Sheet, VLC, Inc., 2 pages (2000).
"Jackpot Stampede Deluxe™" Product Sheet, WMS Gaming Inc., 2 pages (1997).
"Loaded Dice" Product Sheet, Konami Gaming, 2 pages (2000).
"Neptune's Pearls" Product Sheet, Unidesa Gaming, 4 pages (1998).
"Penguin Pays" Product Sheet, Aristocrat Incorporated, 2 pages (1998).
"Stroke Of Luck™" Product Sheet, WMS Gaming Inc., 2 pages (1997).
"Wild Cougar" Article, Strictly Slots, p. 44 (Feb. 1999).
"Yahtzee® Brand Video Game" Product Brochure, Hasbro, Inc., 2 pages (2000).
Decision of Refusal of Aug. 30, 2005, issued from Japanese Patent Office for the corresponding Japanese application No. 2000-051314.

* cited by examiner

GAMING MACHINE WITH SUPERIMPOSED DISPLAY IMAGE

CROSS REFERENCE TO RELATED APPLICATIONS

This application is a continuation of U.S. patent application Ser. No. 10/321,896, filed Dec. 17, 2002 now U.S. Pat. No. 7,160,187, which is in turn a continuation of U.S. patent application Ser. No. 09/862,574, filed May 22, 2001 and is now U.S. Pat. No. 6,517,433 issued on Feb. 11, 2003. Both of these applications are hereby incorporated by reference in their entirety.

FIELD OF THE INVENTION

The present invention relates generally to reel spinning slot machines and, more particularly, to a reel spinning slot machine with a video image superimposed upon the mechanical reels of the machine.

BACKGROUND OF THE INVENTION

A reel spinning slot machine generally comprises a plurality of mechanical rotatable reels controlled by a processor. In response to a wager, the processor randomly selects an outcome from a plurality of possible outcomes and then causes the reels to be rotated and stopped to display the selected outcome. The selected outcome is represented by certain symbols on the reels being in visual association with a display area. If the selected outcome corresponds to a winning outcome identified on a pay table, the processor instructs a payoff mechanism to award a payoff for that winning outcome to the player in the form of coins or credits.

Heretofore, the display area of reel spinning slot machines has been fairly mundane. Any proposals for changing the appearance of the display area have been fairly minor and limited in capability. For example, in U.S. Pat. No. 6,056,642 to Bennett, reel symbols are colored by backlighting the symbols with colored light bulbs or similar means. In U.S. Pat. No. 6,027,115 to Griswold et al., the reels themselves contain electroluminescent elements that define one or more reel symbols, such as cherries, bars, a number "7," etc. If multiple electroluminescent elements are provided for a particular symbol, that symbol may be displayed in multiple formats. Although the above proposals change the appearance of the display area to some extent, a need exists for a spinning reel slot machine with a structure capable of effecting more extravagant changes to the appearance of the display area.

SUMMARY OF THE INVENTION

Accordingly, a spinning reel slot machine comprises a plurality of mechanical rotatable reels and a video display. In response to a wager, the reels are rotated and stopped to randomly place symbols on the reels in visual association with a display area. The video display provides a video image superimposed on the reels. The video image may be interactive with the reels and include such graphics as payout values, a pay table, pay lines, bonus game features, special effects, thematic scenery, and instructional information. The present invention is advantageous in that it is capable of effecting extravagant changes to the appearance of the display area and displaying the graphics within the player's focus (i.e., the mechanical reels).

BRIEF DESCRIPTION OF THE DRAWINGS

The foregoing and other advantages of the invention will become apparent upon reading the following detailed description and upon reference to the drawings.

Figure 1:
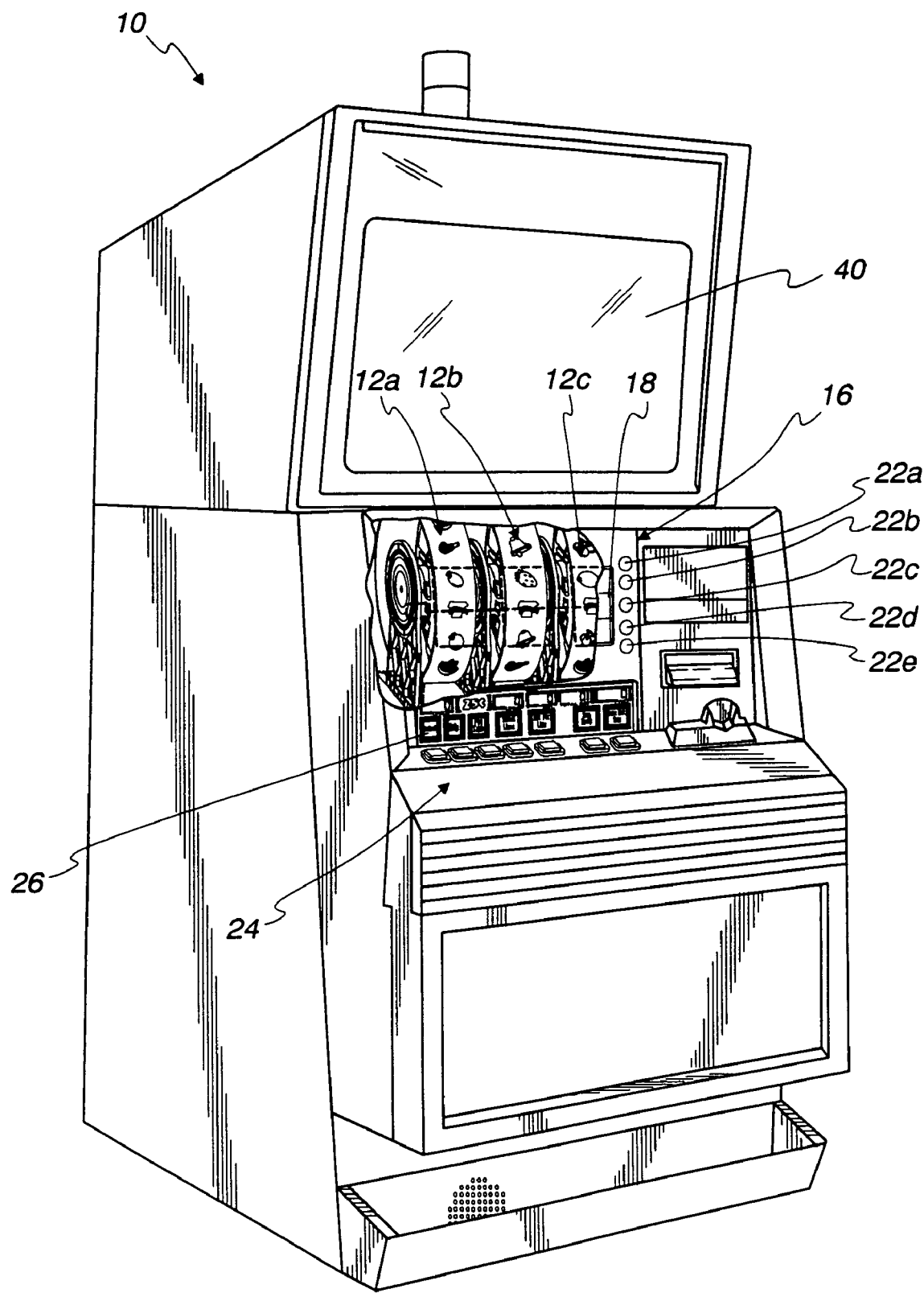
FIG. 1 is an isometric view of a spinning reel slot machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 2A:
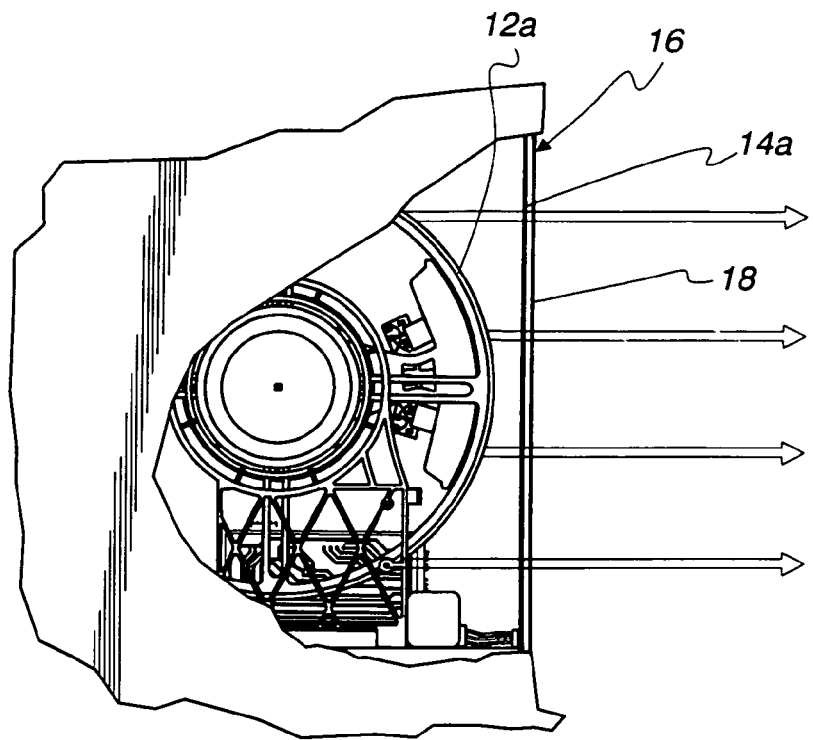
FIG. 2a is a side view of the slot machine with portions broken away to reveal internal structure in accordance with a first embodiment of the present invention.
Figure 2B:
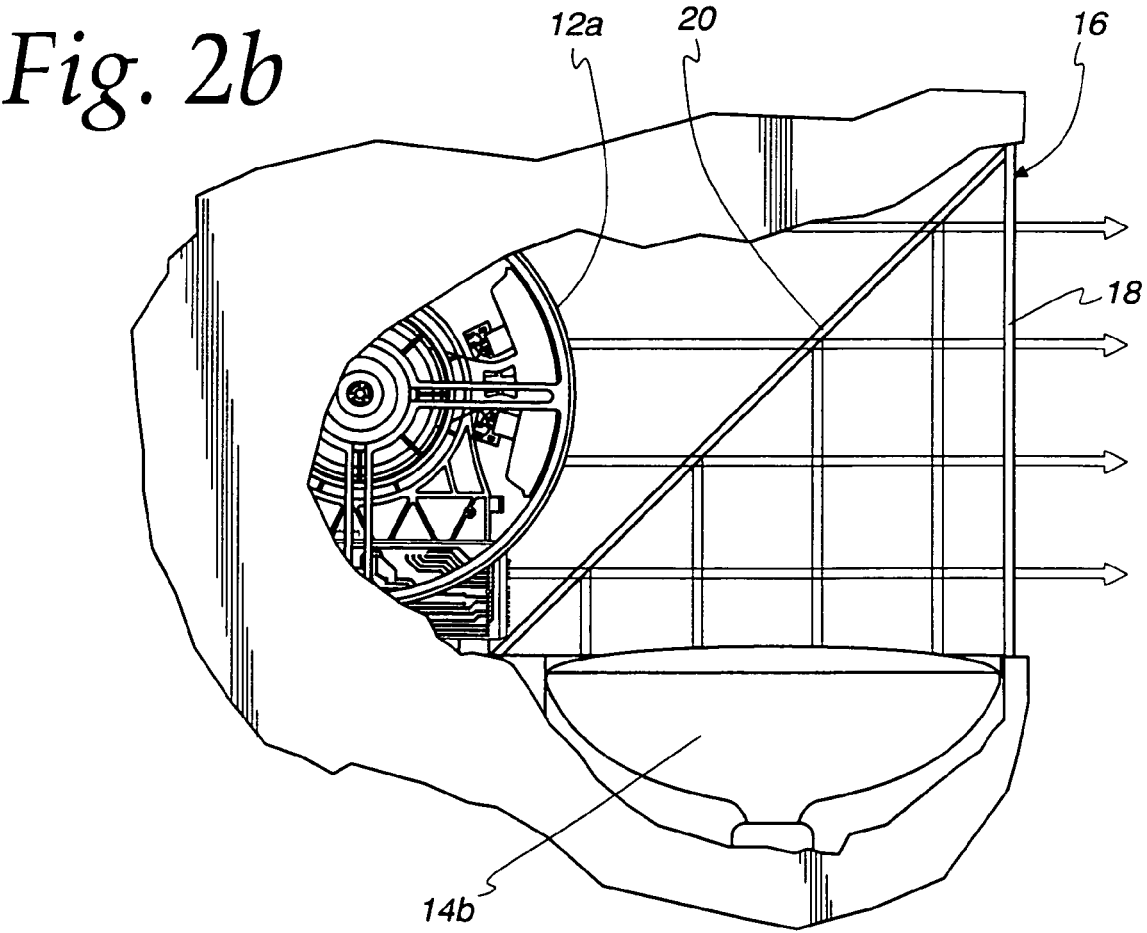
FIG. 2b is a side view of the slot machine with portions broken away to reveal internal structure in accordance with a second embodiment of the present invention.

Turning now to the drawings and referring initially to FIG. 1, a spinning reel slot machine 10 comprises a plurality of mechanical rotatable reels 12a, 12b, 12c and a video display (see FIGS. 2a and 2b). In response to a wager, the reels 12a, 12b, 12c are rotated and stopped to randomly place symbols on the reels in visual association with a display area 16. Payouts are awarded based on combinations and arrangements of the symbols appearing in the display area 16. The video display provides a video image 18 occupying the display area 16 and superimposed on the reels 12a, 12b, 12c. The video image 18 may be interactive with the reels 12a, 12b, 12c, may be static or dynamic, and may include such graphics as payout values, a pay table, pay lines, bonus game features, special effects, thematic scenery, and instructional information. In the illustrated embodiment, the slot machine 10 is an "upright" version in which the display area 16 is oriented vertically relative to the player. Alternatively, the slot machine 10 may be a "slant-top" version in which the display area 16 is slanted at about a thirty degree angle toward the player of the slot machine 10.

Referring to FIGS. 2a and 2b, the video image 18 in the display area 16 may be to either a direct image (FIG. 2a) or a virtual image (FIG. 2b). If the video image 18 is a direct image, as in FIG. 2a, the direct image is preferably generated by a flat panel transmissive video display 14a positioned in front of the reels 12a, 12b, 12c. The transmissive display 14a may, for example, be a transmissive liquid crystal display (LCD) commercially available from LG Phillips LCD Co., Ltd., of Seoul, Korea. The transmissive display 14a may be outfitted with a touch screen mounted to a front surface of the display 14a. The touch screen contains soft touch keys denoted by the image on the underlying display 14a and used to operate the slot machine 10.

If the video image 18 is a virtual image, as in FIG. 2b, the virtual image is preferably generated by a projection arrangement including a video display 14b and a partially reflective mirror 20. The video display 14b and the partially reflective mirror 20 are relatively positioned to project the virtual image in front of the reels 12a, 12b, 12c between the reels and a player. The video display 14b is preferably mounted below the reels 12a, 12b, 12c and is generally perpendicular to the display area 16. The mirror 20 is preferably mounted in front of the reels 12a, 12b, 12c and is oriented at approximately a forty-five degree angle relative to both the video display 14b and the display area 16. The virtual image is generally parallel to the display area 16 and may, in fact, occupy the display area 16. Also, the virtual image may be three-dimensional. In the embodiment of FIG. 2b, the display area 16 includes a glass cover/window. This cover is optionally outfitted with a touch screen that contains soft touch keys denoted by the virtual image and used to operate the slot machine 10.

The video display 14b in FIG. 2b may be a CRT, LCD, dot matrix, LED, electro-luminescent, or other type of video display known in the art. Also, instead of mounting the video display 14b below the reels 12a, 12b, 12c, the display 14b may be mounted above the reels with the mirror 20 still oriented at approximately a forty-five degree angle relative to both the video display 14b and the display area 16.

Referring back to FIG. 1, the slot machine 10 is operable to play a basic slot game with the three mechanical spinning reels 12a, 12b, 12c and a bonus game triggered by a start-bonus outcome in the basic game. The number of mechanical reels may vary, for example, to include one or more additional reels. The mechanical reels may be mounted to a horizontal axis to spin vertically as shown or may, alternatively, be mounted to a vertical axis to spin horizontally. Also, instead of each column of symbols being associated with a single reel, each individual symbol may associated with a single reel such that a symbol array of nine symbols is associated with nine distinct reels. Each of five pay lines 22a, 22b, 22c, 22d, 22e extends through one symbol on each of the three mechanical reels. The number of pay lines may be more or less than five and may have various configurations.

Figure 3:
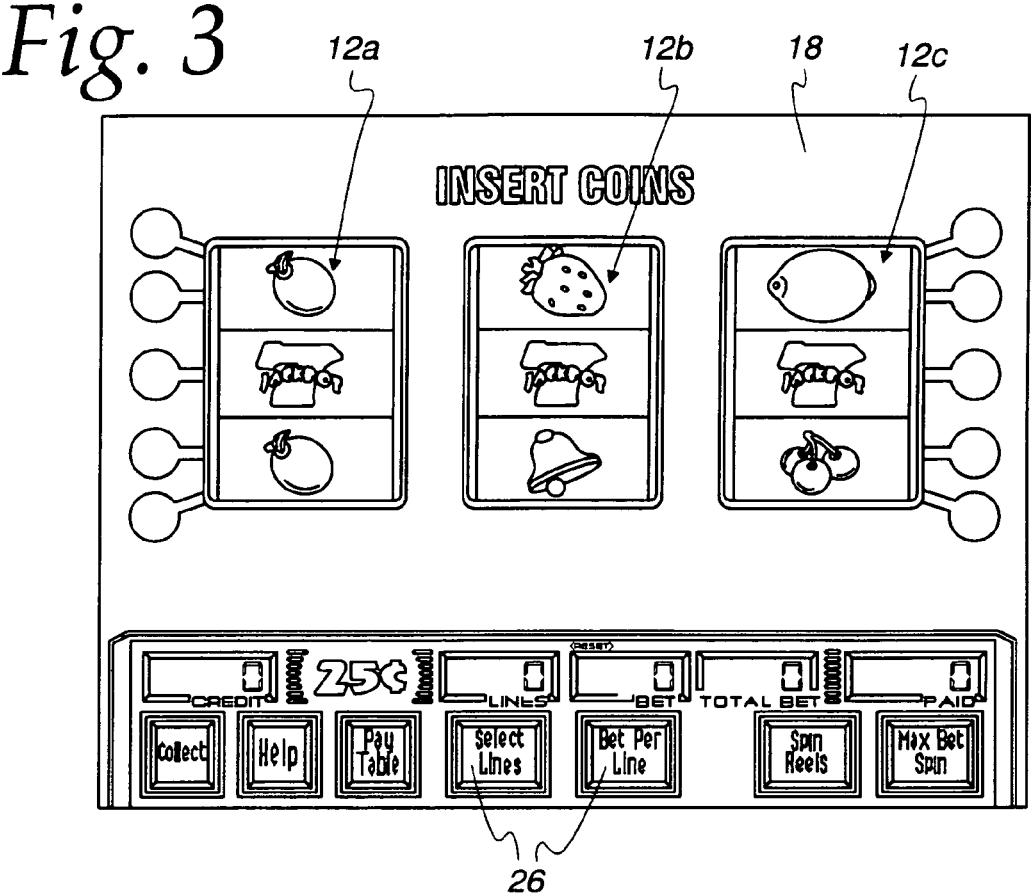
FIGS. 3-7 are front views of a display area of the slot machine with various video images superimposed on the mechanical reels.
Figure 4:
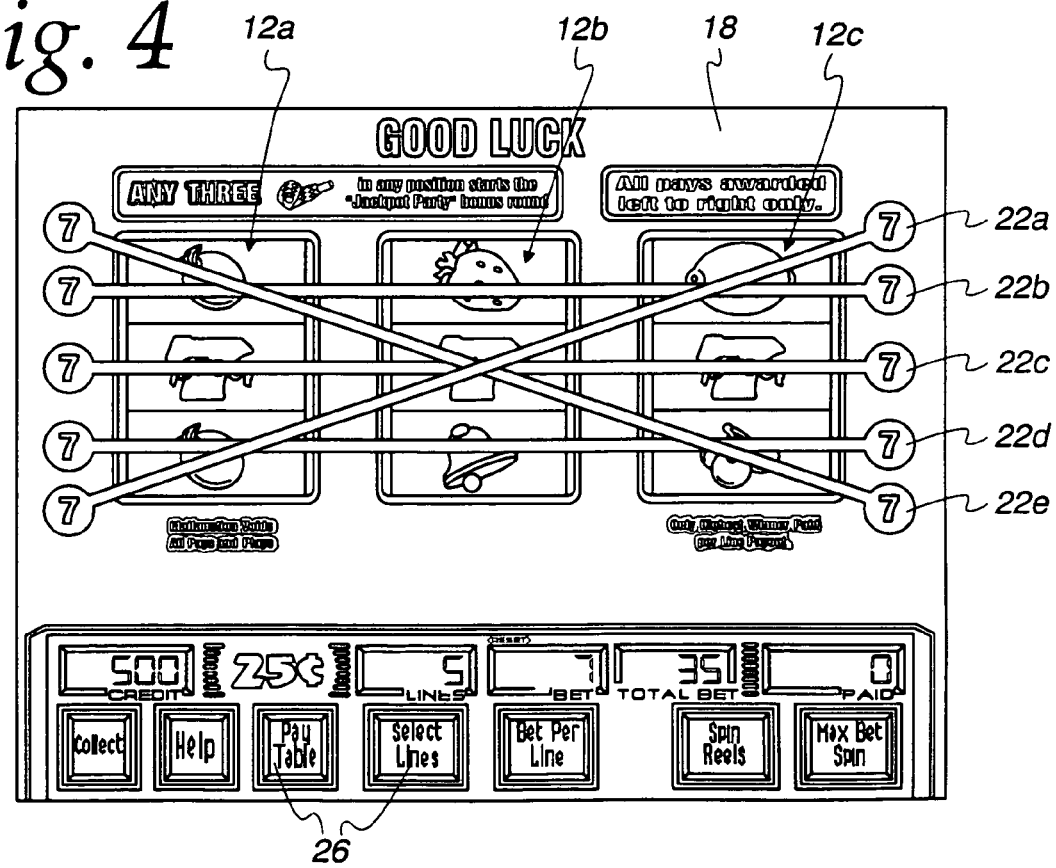

Generally, game play is initiated by inserting a number of coins or playing a number of credits, causing a central processing unit to activate a number of pay lines corresponding to the number of coins or credits played. As shown in FIG. 3, the superimposed video image 18 may depict instructional information prompting the player to insert coins or play credits. The player selects the number of pay lines (between one and five) to play by pressing a "Select Lines" key on a button panel 24. The player then chooses the number of coins or credits to bet on the selected pay lines by pressing a "Bet Per Line" key on the button panel 24. As shown in FIG. 4, the superimposed video image 18 may depict the activated pay lines and the number of wagered credits per pay line.

After activation of the pay lines, the reels 12a, 12b, 12c may be set in motion by touching a "Spin Reels" key on the button panel 24 or, if the player wishes to bet the maximum amount per line, by using a "Max Bet Spin" key on the button panel 24. Alternatively, other mechanisms such as, for example, a lever may be used to set the reels in motion. The central processing unit uses a random number generator to select a game outcome (e.g., "basic" game outcome) corresponding to a particular set of reel "stop positions." The central processing unit then causes each of the mechanical reels to stop at the appropriate stop position. Symbols are printed on the reels to graphically illustrate the reel stop positions and indicate whether the stop positions of the reels represent a winning game outcome.

Figure 5:
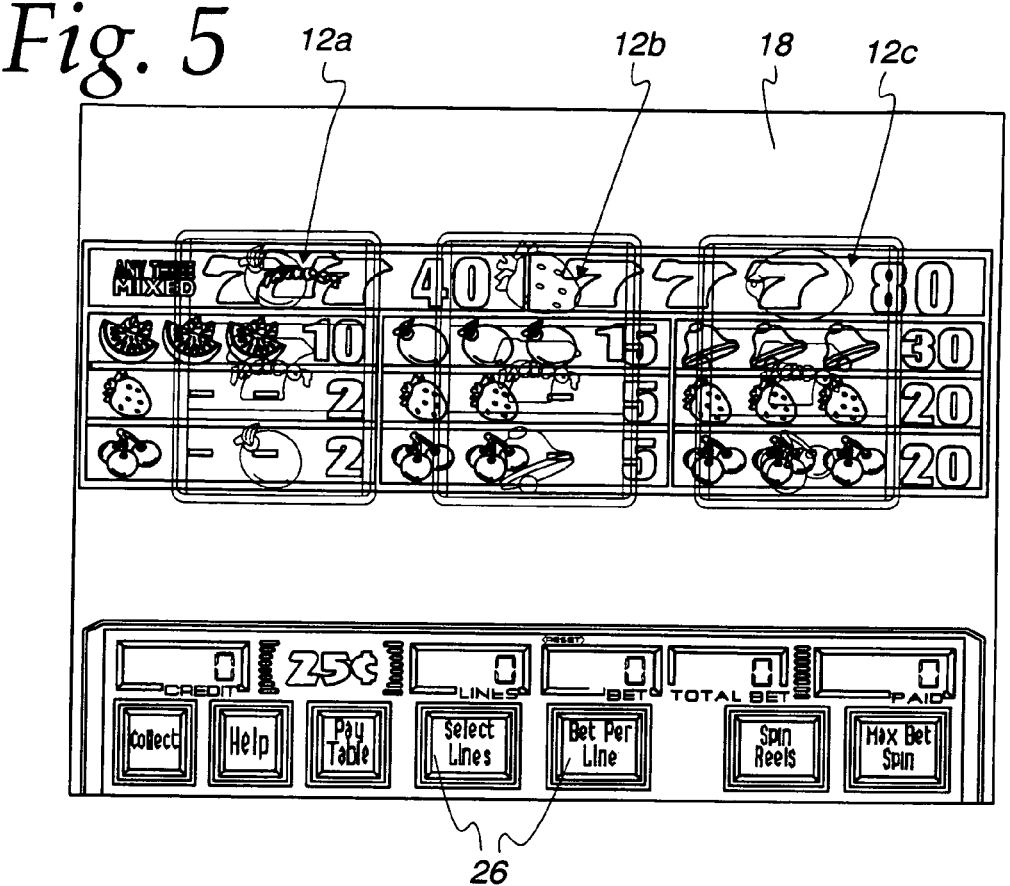
Figure 6:
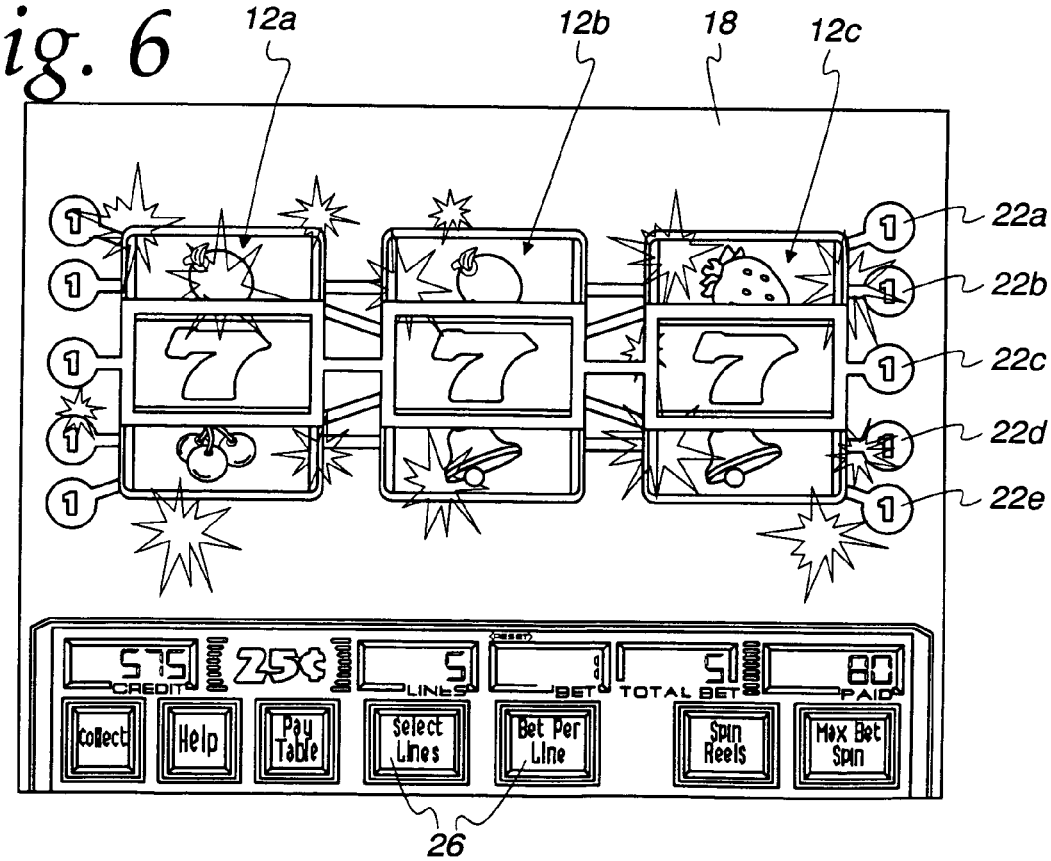

Winning basic game outcomes (e.g., symbol combinations resulting in payment of coins or credits) are identifiable to the player by a pay table. As shown in FIG. 5, the superimposed video image 18 may depict the pay table in response to a command by the player (e.g., by pressing a "Pay Table" key on the button panel 24). A winning basic game outcome occurs when the symbols appearing on the reels 12a, 12b, 12c along an active pay line correspond to one of the winning combinations on the pay table. A winning combination, for example, could be three matching symbols along an active pay line. If the displayed symbols stop in a winning combination, the game credits the player an amount corresponding to the award in the pay table for that combination multiplied by the amount of credits bet on the winning pay line. As shown in FIG. 6, the superimposed video image 18 may highlight the winning combination(s) (e.g., "7," "7," "7") and its associated pay line (e.g., pay line 22c) and depict the award for that winning combination. The video image 18 may further include special effects such as flashing the winning pay line(s) and/or the award and providing explosions. The winning pay line(s) may flash, be accompanied by exploding flashes, and display a portion of the pay table. The player may collect the amount of accumulated credits by pressing a "Collect" key on the button panel 24. In one implementation, the winning combinations start from the first reel 12a (left to right) and span adjacent reels. In an alternative implementation, the winning combinations start from either the first reel 12a (left to right) or the third reel 12c (right to left) and span adjacent reels.

If the display area 16 includes a touch screen mounted to either the transmissive display 14a in the direct image embodiment of FIG. 2a or the glass cover in the virtual image embodiment of FIG. 2b, the video image 18 may duplicate some or all of the aforementioned keys on the button panel 24 as touch keys 26 as shown in various Figures. A player can then enable a desired function either by touching the touch screen at an appropriate touch key 26 denoted by the video image 18 or by pressing an appropriate key on the button panel 24.

Included among the plurality of basic game outcomes is a start-bonus outcome for triggering play of a bonus game. A start-bonus outcome may be defined in a number of ways. For example, a start-bonus outcome may occur when a special start-bonus symbol or a special combination of symbols appears on one or more of the reels 12a, 12b, 12c. The start-bonus outcome may require the combination of symbols to appear along an active pay line or may, alternatively, require that the combination of symbols appear anywhere on the display, regardless of whether the symbols are along an active pay line. The appearance of a start-bonus outcome causes the central processing unit to shift operation from the basic slot game to the bonus game.

Figure 7:
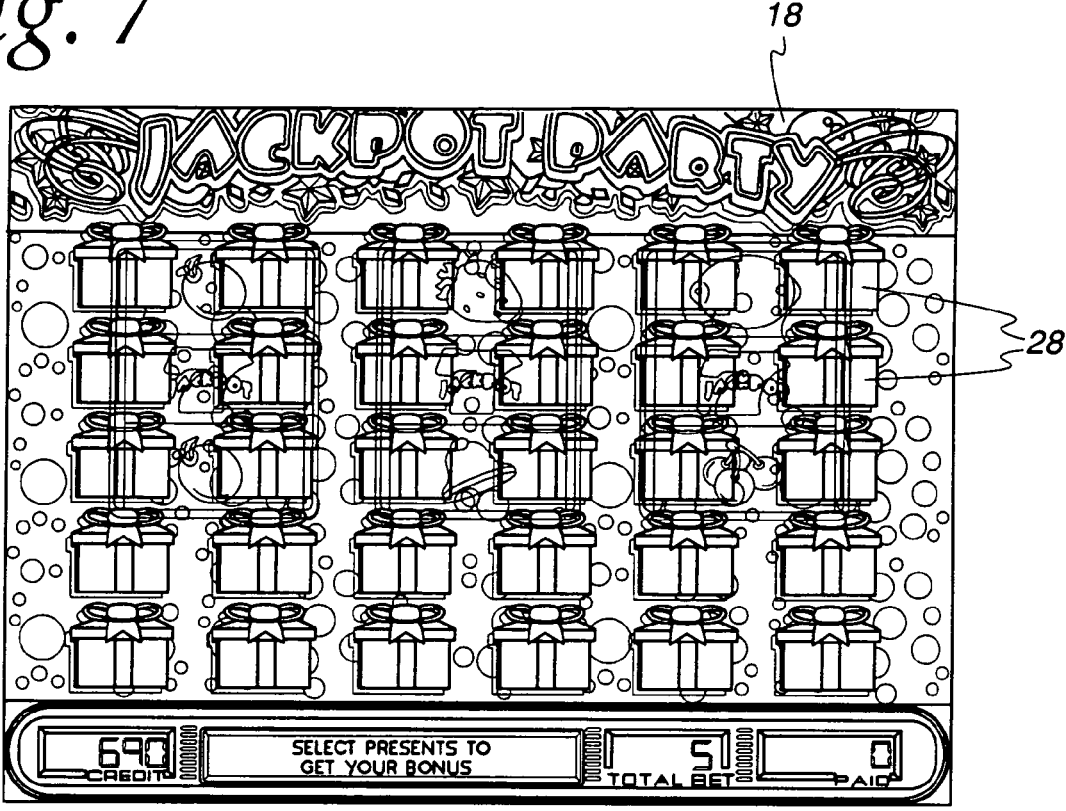

As shown in FIG. 7, the video image 18 may depict the bonus game and any bonuses resulting therefrom. The bonus game may, for example, include free spins of a new set of video reels included in the video image 18. Winning combinations on the video reels may be defined by the same pay table as used for the mechanical reels or a different pay table altogether. The bonus game may be interactive and require a player to select one or more selectable elements 28 to earn bonuses. Also, the bonus game may depict one or more animated events and award bonuses based on an outcome of the animated events. Furthermore, the bonus game may be depicted by the video image 18 alone or in conjunction with a video image depicted on an optional secondary video display 40 (see FIG. 1). The two video images may be linked to appear like one unified image. Upon completion of the bonus game, the central processing unit shifts operation back to the basic slot game.

Figure 8A:
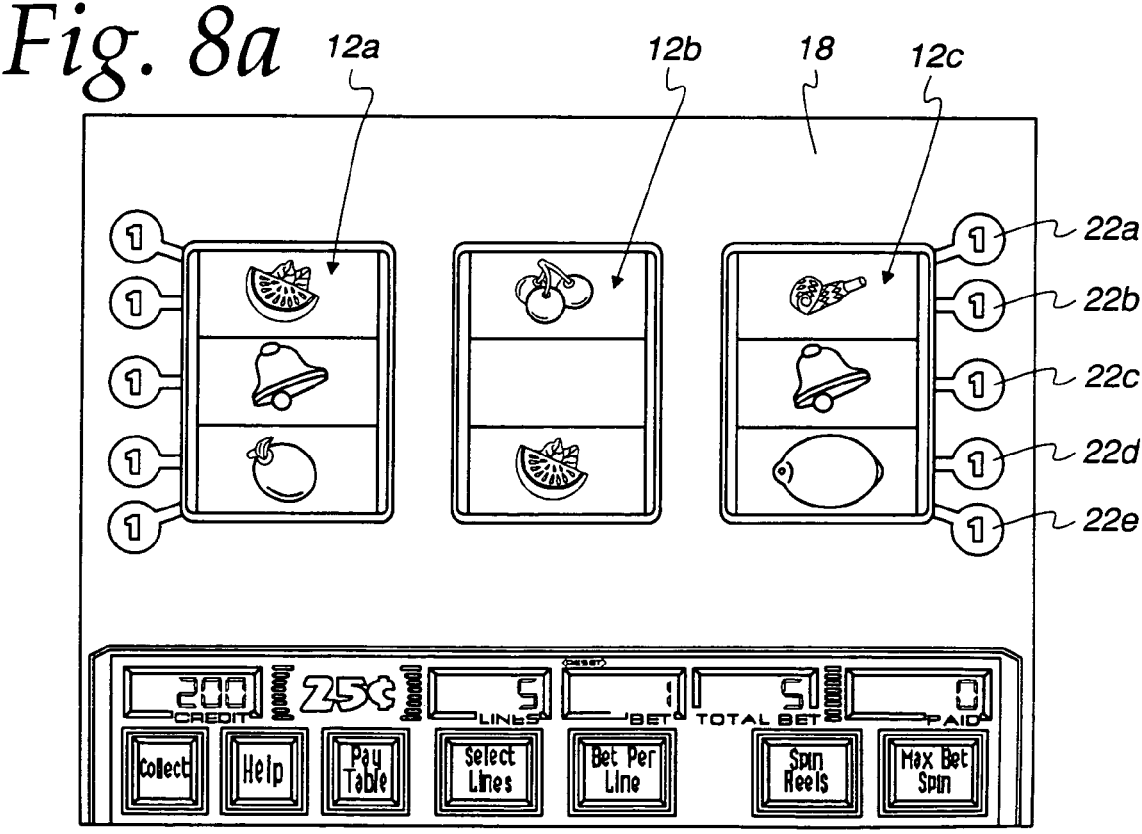
FIGS. 8a-8c are front views of a display area of the slot machine with various video images superimposed on the mechanical reels to modify one or more symbols printed on one or more of the stormed mechanical reels.
Figure 8B:
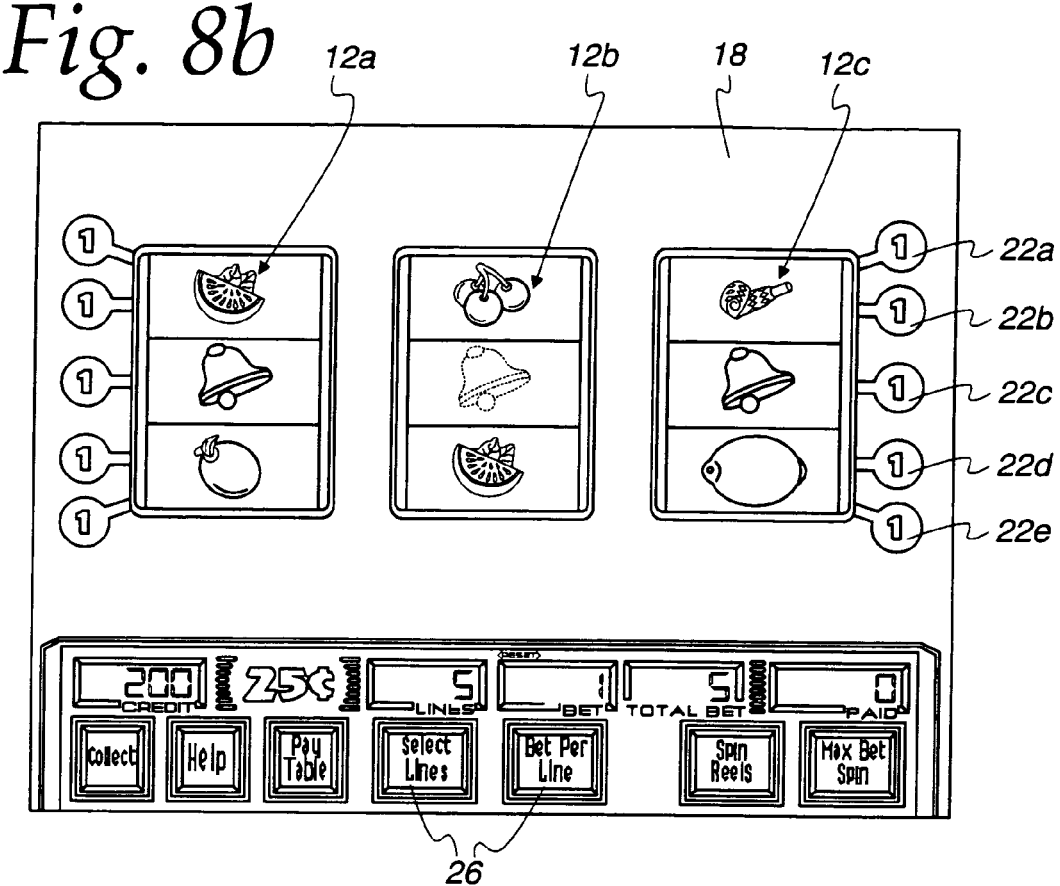
Figure 8C:
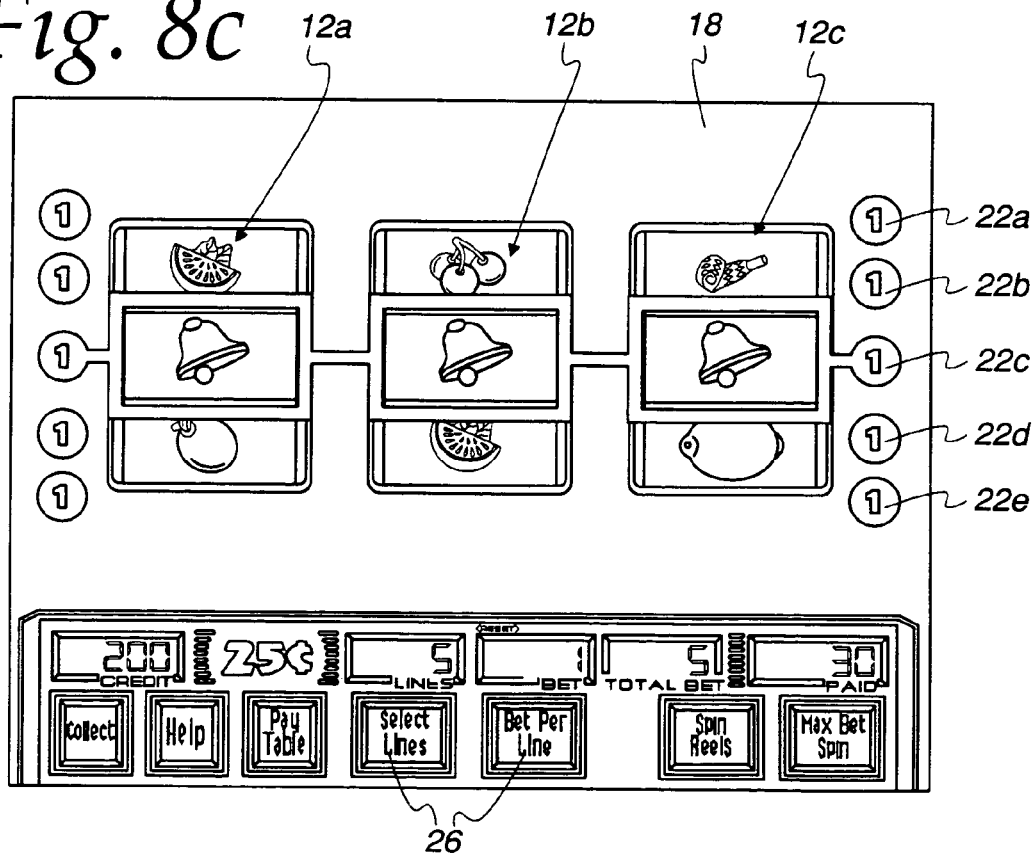
Figure 9A:
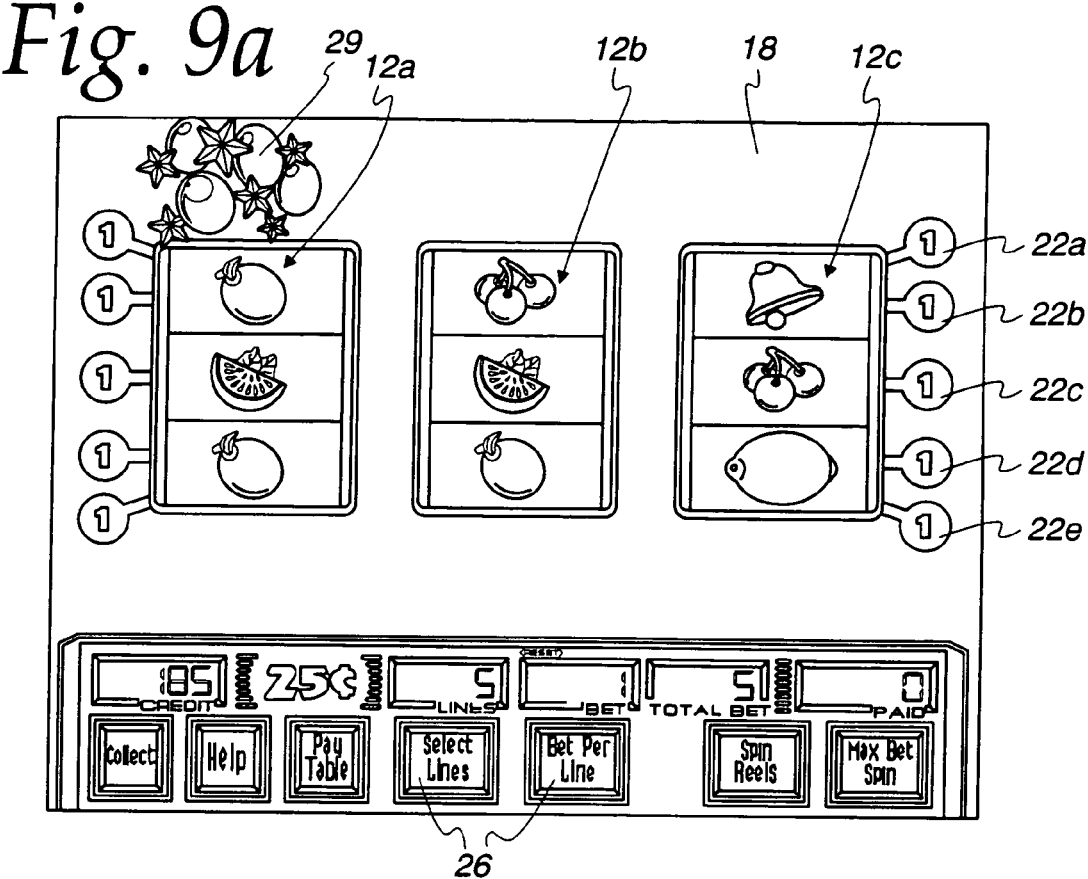
FIGS. 9a-9c are front views of a display area of the slot machine with various video images superimposed on the mechanical reels to modify one or more symbols printed on one or more of the stopped mechanical reels.
Figure 9B:
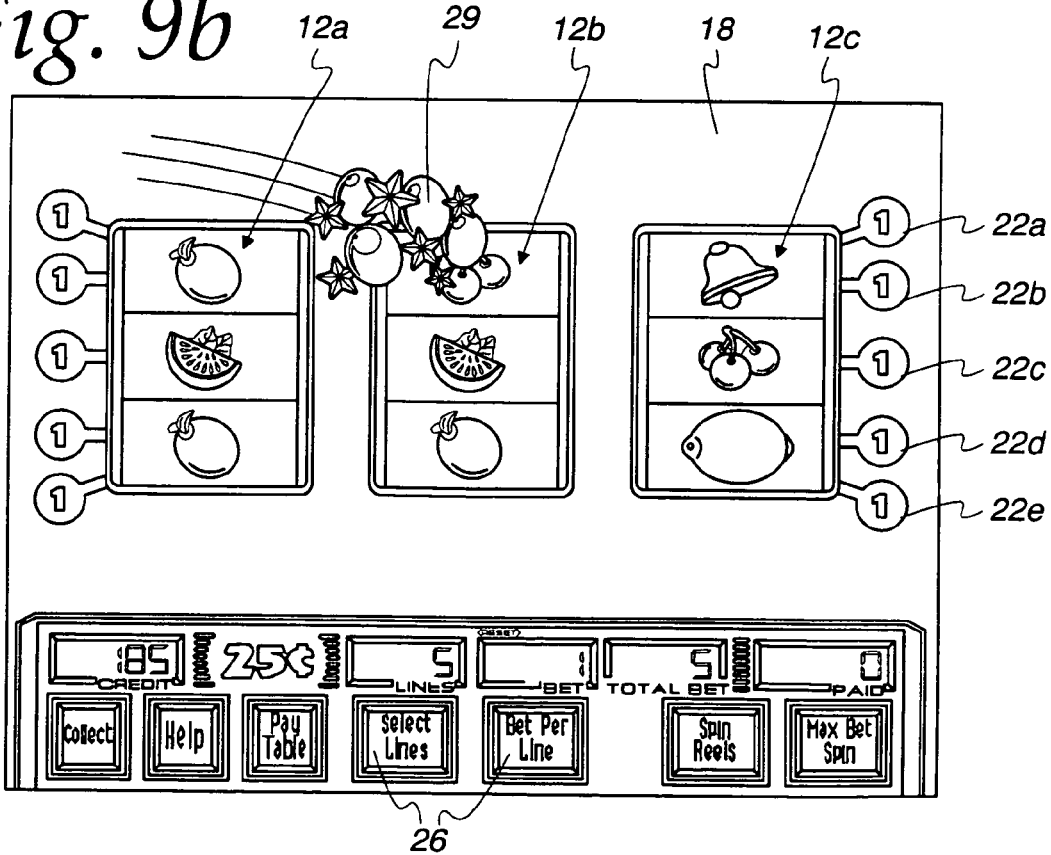
Figure 9C:
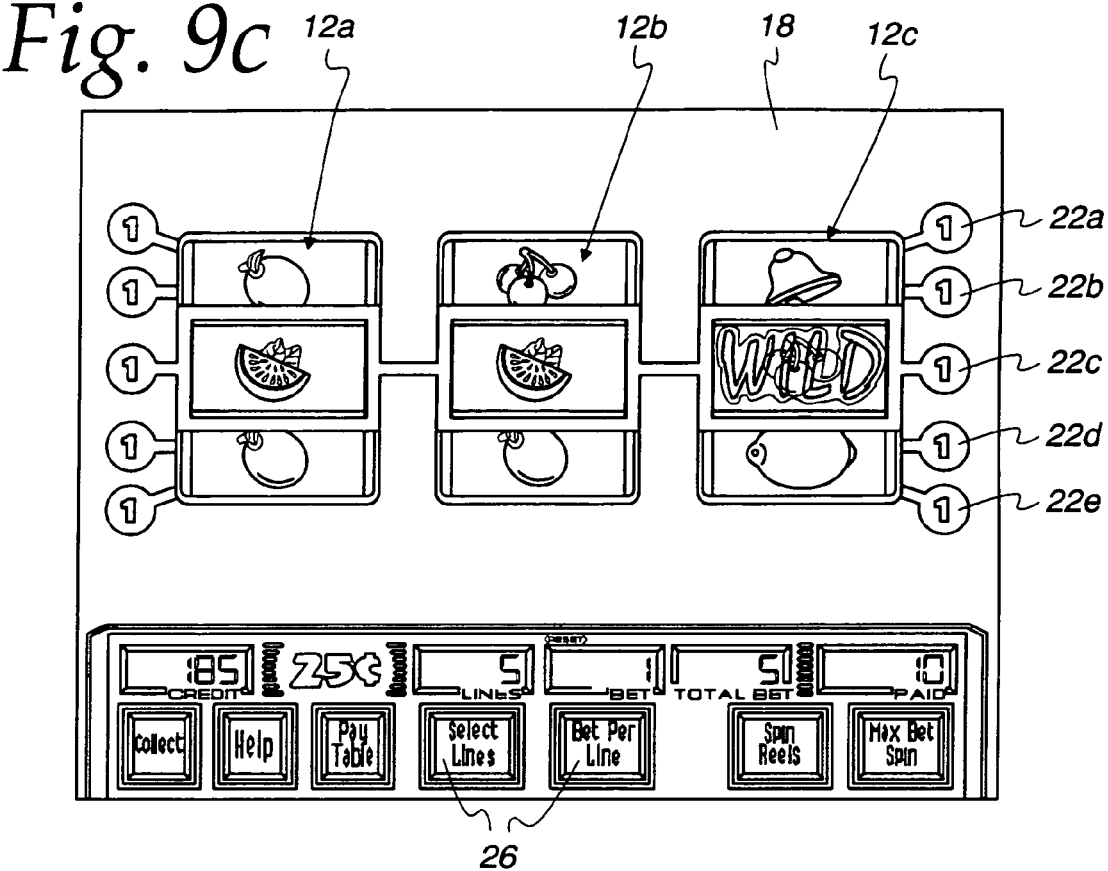
Figure 10A:
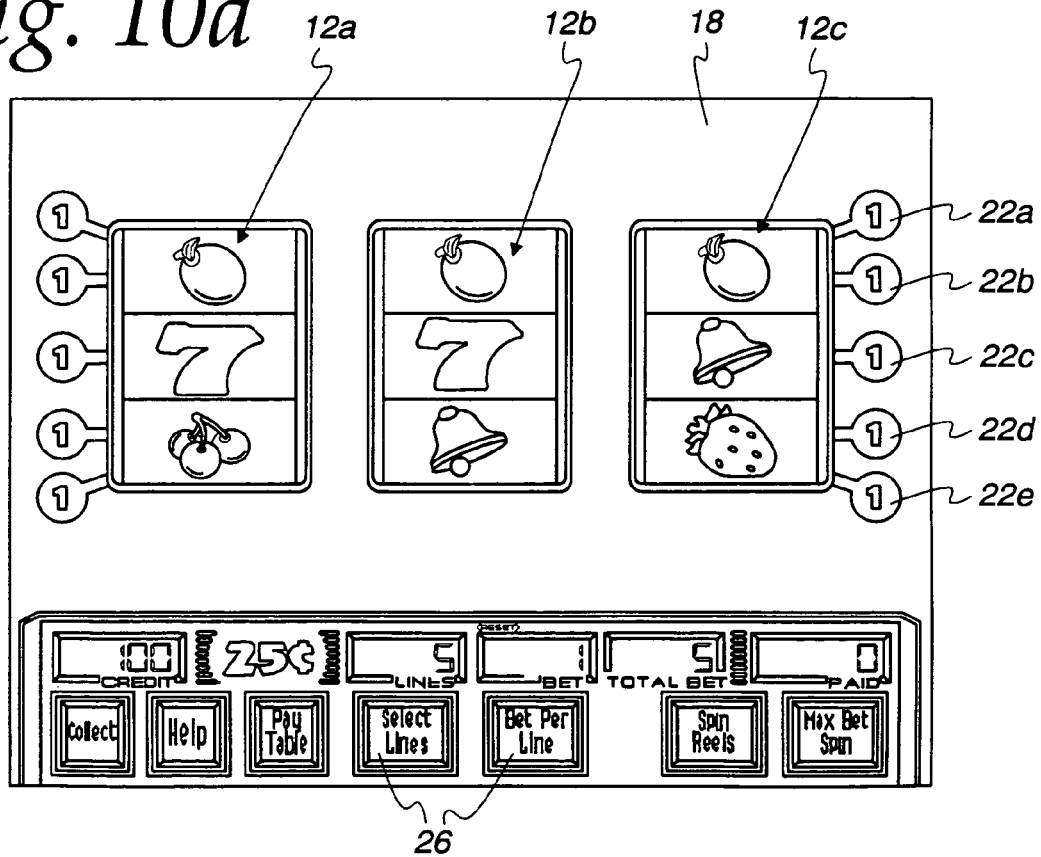
FIGS. 10a-c are front views of a display area of the slot machine with various video images superimposed on the mechanical reels to modify one or more symbols printed on one or more of the stopped mechanical reels.
Figure 10B:
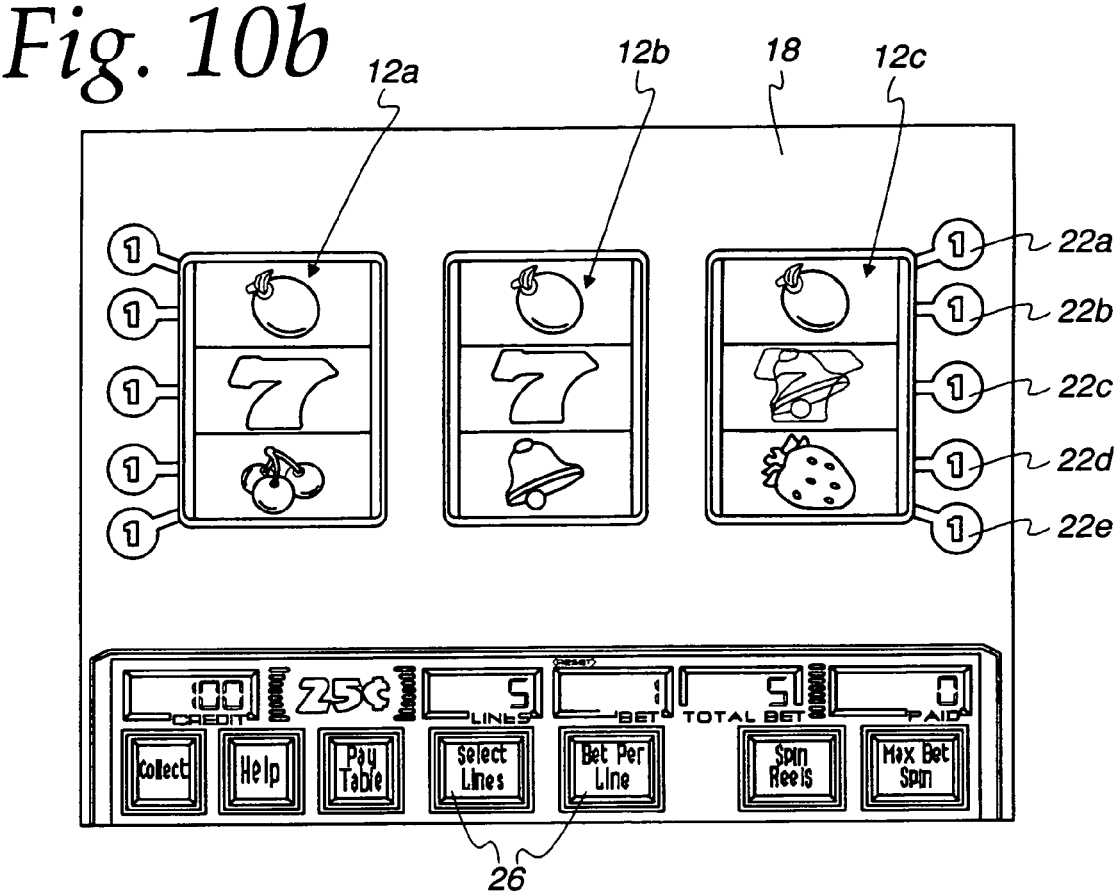
Figure 10C:
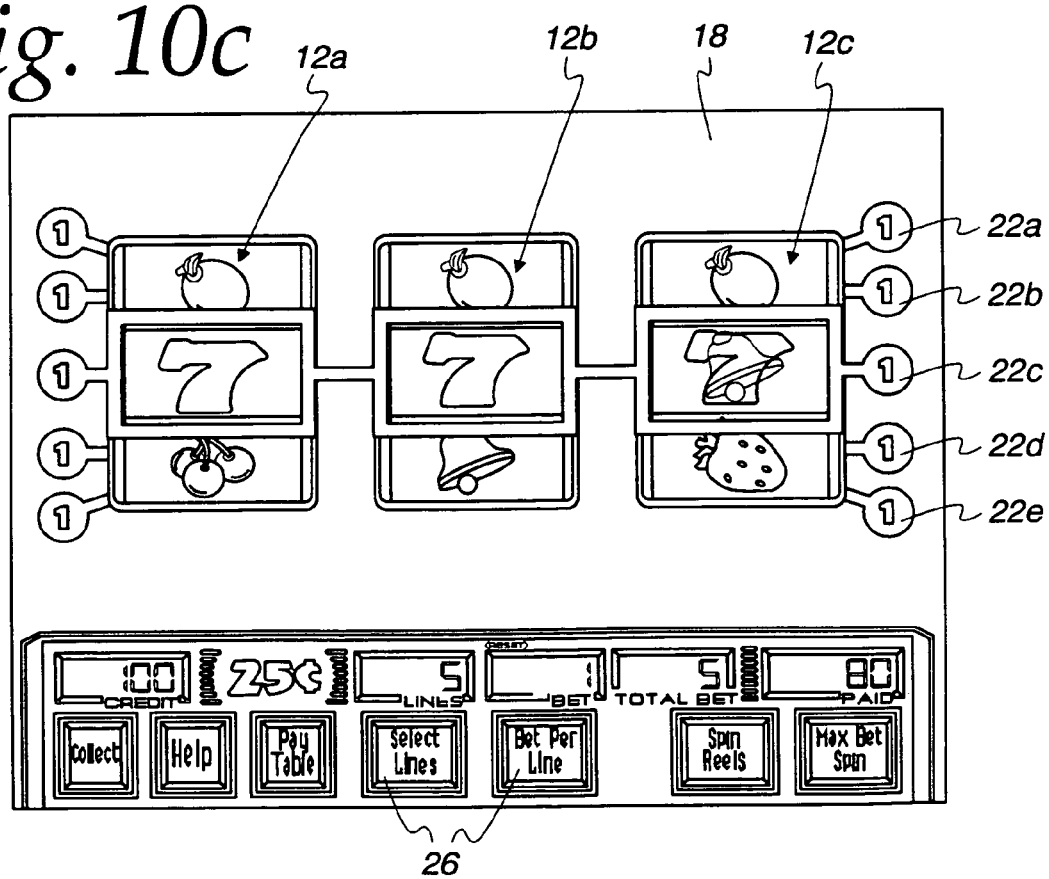

As shown in FIGS. 8*a-c*, 9*a-c*, and 10*a-c*, the video image 18 may be used to modify one or more symbols printed on one or more of the stopped mechanical reels 12*a*, 12*b*, 12*c*. For example, in response to a predetermined random or non-random event, the video image 18 may transform a reel symbol into a different symbol, such as a symbol needed to complete a winning combination. The different symbol is generated by the video image 18. In FIGS. 8*a-c*, the video image 18 depicts an animation transforming (e.g., "morphing") a blank symbol on mechanical reel 12*b* into a BELL symbol to form a winning combination of three BELL symbols along pay line 22*c*. In addition, referring to FIGS. 9*a-c*, in response to a predetermined random or non-random event, the video image 18 may depict an animation in which a video indicator 29 is moved from a periphery of the display area (e.g., a corner of the display area away from the mechanical reels) to one or more of the symbols on the reels. The moving indicator 29 may identify the reel symbols to which it moves as a special symbol to be evaluated as, for example, a wild symbol or a scatter pay symbol. In FIGS. 10*a-c*, a video indicator 29 has moved to a CHERRY symbol on mechanical reel 12*c*. If the CHERRY symbol is thereby designated a wild symbol, the displayed symbol array includes a winning combination of three MELON symbols along pay line 22*c* where one of the three MELON symbols is formed by the wild symbol. Further, in FIGS. 10*a-c*, the video image 18 depicts an animation transforming a BELL symbol on reel 12*c* into a SEVEN symbol to form a winning combination of three SEVEN symbols along pay line 22*c*. The replacement SEVEN symbol generated by the video image 18 is sufficiently opaque or translucent to substantially cover the BELL symbol printed on mechanical reel 12*c*.

The slot machine is preferably designed to adjust the appearance of the video image 18 in terms of transparency, translucency, or opacity depending on the purpose of the video image 18. On the one hand, to permit clear viewing of the mechanical reels 12*a*, 12*b*, 12*c* underlying the video image 18, the portion of the video image 18 directly overlying the reels is made more transparent.

On the other hand, to facilitate viewing of the video image 18 without visual interference from the underlying mechanical reels, the video image 18 is made more opaque through proper selection of colors and their level of brightness. Also, to accentuate the video image 18 relative to the underlying reels following a reel spin, any lamps illuminating the reels during a reel spin may be turned off or dimmed following the reel spin. In addition, if the reels include blank symbols (e.g., solid white areas), any video graphics over such blank symbols will be readily visible. Similarly, any video graphics alongside, just above, or just below the underlying reels will be readily visible. Further, in the direct image embodiment of FIG. 2*a*, the transmissive video display 14*a* may be backed by an extendable opaque shade during the bonus game. The shade is retracted from the display area 16 during the basic slot game. When the central processing unit shifts operation from the basic slot game to the bonus game, the shade extends through the display area to separate the transmissive video display 14*a* from the underlying reels and thereby completely shield the underlying reels.

Figure 11:
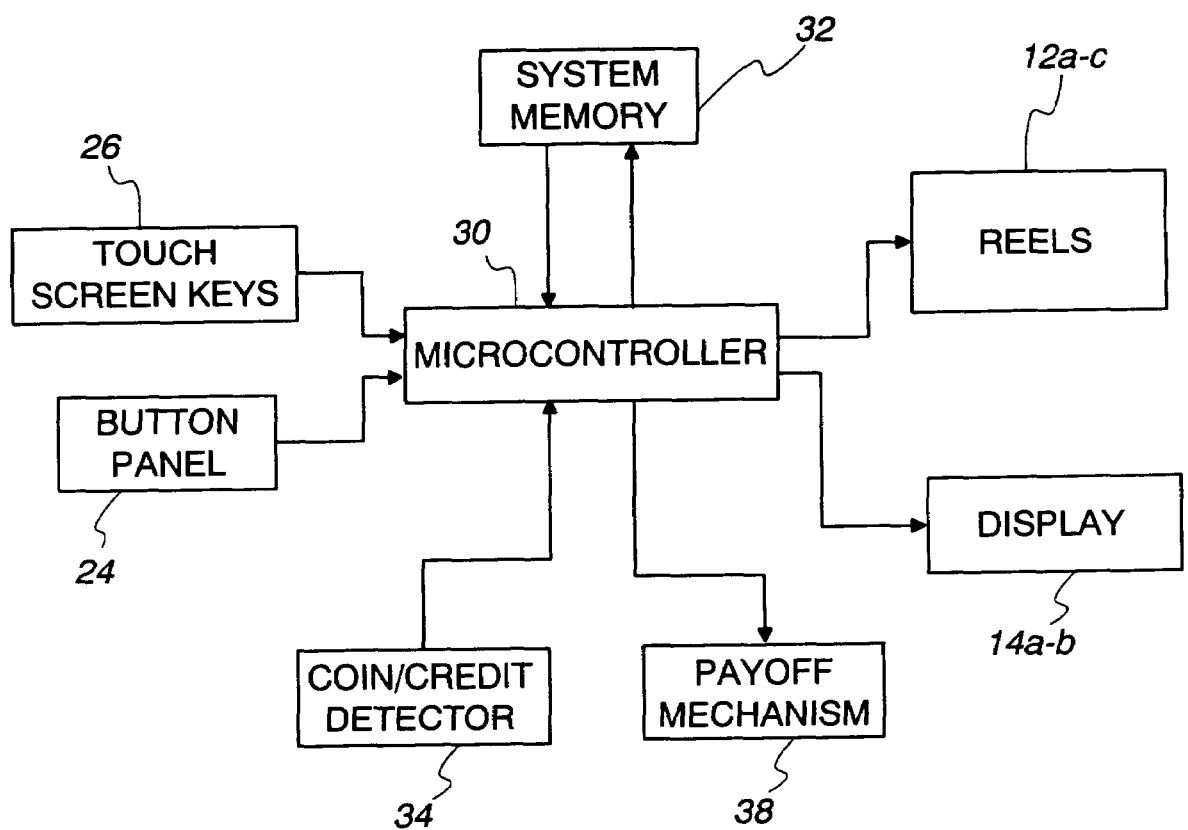
FIG. 11 is a block diagram of a control system suitable for operating the slot machine.

FIG. 11 is a block diagram of a control system suitable for operating the slot machine. The control system includes a central processing unit with a microcontroller 30 and system memory 32. The memory 32 preferably comprises a separate read-only memory (ROM) and battery-backed random-access memory (RAM). It will be appreciated, however, that the system memory 32 may be implemented on any of several alternative types of memory structures or may be implemented on a single memory structure. For example, the read-only memory may be replaced or supplemented with a mass storage unit such as a removable flash memory or a hard drive. The system memory is used to store game-related data associated with the chance games played on the slot machine. The game-related data may, for example, include game code, math tables, a random number generator, audio resources, and video resources. The player may select an amount to wager and other game play functions via the touch screen keys 26 (if provided) or button panel 24. The wager amount is signaled to the microcontroller 30 by a coin/credit detector 34. In response to the wager, the microcontroller 30 executes the game code which, based on a randomly selected outcome, rotates and stops the mechanical reels 12*a*, 12*b*, 12*c* at the selected outcome. Also, the microcontroller 30 selectively accesses the video resources to be included in the video image 18 provided by the video display 14*a* (FIG. 2*a*) or 14*b* (FIG. 2*b*) and the audio resources to be played through one or more audio speakers 36 mounted to a housing of the slot machine. If the outcome corresponds to a winning outcome identified on the pay table, the microcontroller 30 instructs a payoff mechanism 38 to award a payoff for that winning outcome to the player in the form of coins or credits.

While the present invention has been described with reference to one or more particular embodiments, those skilled in the art will recognize that many changes may be made thereto without departing from the spirit and scope of the present invention. For example, instead of the video image 18 depicting a bonus game triggered by a start-bonus outcome on the mechanical slot reels 12*a*, 12*b*, 12*c*, the roles of the video image 18 and the slot reels may be reversed. The video image 18 may depict a basic game including a start-bonus outcome for triggering a bonus game involving spins of the slot reels. Each of these embodiments and obvious variations thereof is contemplated as falling within the spirit and scope of the claimed invention, which is set forth in the following claims.

What is claimed is:

1. A gaming machine for playing a wagering game, the gaming machine comprising:
   a first image associated with the wagering game; and
   a second image overlaying the first image during a special event of the wagering game, the second image being a video image, the video image being spatially separated from the first image, the first image being at least partially visible through the video image, the video image being adapted to interact with the first image, the video image including player-selectable indicia that, upon player selection, affect an outcome of the special event.

2. The gaming machine of claim 1, wherein the first image is a physical image.

3. The gaming machine of claim 1, wherein the first image is a graphical image.

4. The gaming machine of claim 1, wherein the first image is a video image.

5. The gaming machine of claim 1, wherein the first image is a mechanical member.

6. The gaming machine of claim 1, wherein the video image modifies the first image visually without altering the first image.

7. The gaming machine of claim 1, wherein the video image is produced by a transmissive video display.

8. The gaming machine of claim 1, wherein the video image is a virtual image.

9. The gaming machine of claim 1, further including a touchscreen adjacent to the second image, the touchscreen enabling a player to select the player-selectable indicia.

10. The gaming machine of claim 1, further including a touchscreen adjacent to the second image, the touchscreen enabling a player to progress play of the wagering game.

11. The gaming machine of claim 1, wherein the first image includes a plurality of symbol-bearing reels, and wherein one or more of the player-selectable indicia overlay at least one of the reels.

12. The gaming machine of claim 1, wherein the first image includes a plurality of symbol-bearing reels, and wherein one or more of the player-selectable indicia overlay none of the reels.

13. The gaming machine of claim 1, wherein the first image includes a plurality of symbol-bearing reels, and wherein one or more of the player-selectable indicia overlay at least one of the reels and one or more of the player-selectable indicia overlay none of the reels.

14. The gaming machine of claim 1, wherein the player-selectable indicia include a plurality of discrete icons.

15. The gaming machine of claim 1, wherein the wagering game includes a basic game and the special event, the special event being triggered by a start-bonus outcome in the basic game, the player-selectable indicia being associated with the special event.

16. A method of operating a gaming machine, comprising:
displaying a first image associated with a wagering game;
overlaying a second image over the first image during a special event of the wagering game, the second image being a video image and including player-selectable indicia;
spatially separating the video image from the first image, the first image being at least partially visible through the video image;
adapting the video image to interact with the first image; and
receiving, via player input, selections of the player-selectable indicia during the special event of the wagering game and upon selection affecting outcome of the special event.

17. The method of claim 16, wherein the video image modifies the first image visually without altering the first image.

18. The method of claim 16, wherein the video image is produced by a transmissive video display.

19. The method of claim 16, wherein the video image is a virtual image.

20. The method of claim 16, wherein the first image includes a physical member.

21. The method of claim 20, wherein the physical member is a mechanical device.

22. The method of claim 21, wherein the physical member displays at least a portion of an outcome of the wagering game operable on the gaming machine.

23. The method of claim 16, further including a touchscreen adjacent to the second image, wherein the receiving includes receiving the selections via the touchscreen.

24. The method of claim 16, wherein the first image includes a plurality of symbol-bearing reels, and wherein the overlaying includes overlaying one or more of the player-selectable indicia over at least one of the reels.

25. The method of claim 16, wherein the first image includes a plurality of symbol-bearing reels, and wherein the overlaying includes overlaying one or more of the player-selectable indicia over none of the reels.

26. The method of claim 16, wherein the first image includes a plurality of symbol-bearing reels, and wherein the overlaying includes overlaying one or more of the player-selectable indicia over at least one of the reels and overlaying one or more of the player- selectable indicia over none of the reels.

27. The method of claim 16, wherein the player-selectable indicia include a plurality of discrete icons.

28. The method of claim 16, wherein the wagering game includes a basic game and the special event, the special event being triggered by a start-bonus outcome in the basic game, the player-selectable indicia being associated with the special event.

29. A gaming machine for playing a wagering game, comprising:
a physical member located within the gaming machine; and
a video display for displaying a video image, the video image being spatially separated from the physical member, the video display being adapted to interact with the physical member, the video image overlaying the physical member, the physical member being at least partially visible through the video image displayed by the video display, the video display further displaying player-selectable indicia that are displayed during a special event associated with the wagering game and upon selection affecting outcome of the special event.

30. The gaming machine of claim 29, wherein the video display interacts with the physical member to visually modify the physical member.

31. The gaming machine of claim 30, wherein the video display does not change the physical member when visually modifying the physical member.

32. The gaming machine of claim 29, wherein the physical member is a physical image.

33. The gaming machine of claim 29, wherein the physical member is a physical structure.

34. The gaming machine of claim 29, wherein the physical member is a physical representation of a symbol.

35. The gaming machine of claim 29, wherein the physical member is a mechanical device.

36. The gaming machine of claim 29, wherein the physical member displays at least a portion of an outcome of a wagering game operable on the gaming machine.

37. The gaming machine of claim 36, wherein the outcome of the wagering game is visually displayed by the physical member and the video display, the video display displaying at least a portion of the outcome of the wagering game.

38. The gaming machine of claim 29, wherein the video display is a transmissive video display.

39. The gaming machine of claim 29, wherein the video display displays a virtual image.

40. The gaming machine of claim 29, wherein the video display is spatially separated from the physical member.

41. The gaming machine of claim 29, further including a touchscreen adjacent to the video display, the touchscreen enabling a player to select the player-selectable indicia.

42. The gaming machine of claim 29, further including a touchscreen adjacent to the video display, the touchscreen enabling a player to progress play of the wagering game.

43. The gaming machine of claim 29, wherein the physical member includes a plurality of symbol-bearing, rotatable mechanical reels, and wherein one or more of the player-selectable indicia overlay at least one of the reels.

44. The gaming machine of claim 29, wherein the physical member includes a plurality of symbol-bearing, rotatable mechanical reels, and wherein one or more of the player-selectable indicia overlay none of the reels.

45. The gaming machine of claim 29, wherein the physical member includes a plurality of symbol-bearing, rotatable mechanical reels, and wherein one or more of the player-selectable indicia overlay at least one of the reels and one or more of the player-selectable indicia overlay none of the reels.

46. The gaming machine of claim 29, wherein the player-selectable indicia include a plurality of discrete icons.

47. The gaming machine of claim 29, wherein the wagering game includes a basic game and the special event, the special event being triggered by a start-bonus outcome in the basic game, the player-selectable indicia being associated with the special event.

48. A gaming machine for playing a wagering game, comprising:
a first display for visually portraying first indicia associated with a wagering game; and
a second display for displaying a video image including second indicia associated with the wagering game, the video image overlaying the first indicia and being spatially separated from the first indicia, the first indicia being partially visible through the second indicia, the second indicia being adapted to interact with the first indicia, and during a special event associated with the wagering game, the second display further displaying player-selectable indicia that, upon selection, affect the outcome of the special event.

49. The gaming machine of claim 48, wherein the second display is a transmissive video display.

50. The gaming machine of claim 48, wherein the video image of the second display is a virtual image.

51. The gaming machine of claim 48, wherein at least a portion of the first indicia of the first display is visible through the video image of the second display.

52. The gaming machine of claim 48, wherein the second display is spatially separated from the first display.

53. The gaming machine of claim 48, further including a touchscreen adjacent to the second display, the touchscreen enabling a player to select the player-selectable indicia.

54. The gaming machine of claim 48, further including a touchscreen adjacent to the second display, the touchscreen enabling a player to progress play of the wagering game.

55. The gaming machine of claim 48, wherein the first indicia include a plurality of symbol-bearing reels, and wherein one or more of the player-selectable indicia overlay at least one of the reels.

56. The gaming machine of claim 48, wherein the first indicia include a plurality of symbol-bearing reels, and wherein one or more of the player-selectable indicia overlay none of the reels.

57. The gaming machine of claim 48, wherein the first indicia include a plurality of symbol-bearing reels, and wherein one or more of the player-selectable indicia overlay at least one of the reels and one or more of the player-selectable indicia overlay none of the reels.

58. The gaming machine of claim 48, wherein the player-selectable indicia include a plurality of discrete icons.

59. The gaming machine of claim 48, wherein wagering game includes a basic game and the special event, the special event being triggered by a start-bonus outcome in the basic game.

* * * * *